March 22, 1960 F. M. MAYES 2,929,986
APPARATUS FOR IMPEDANCE MEASUREMENTS
Filed April 19, 1955 2 Sheets-Sheet 1

*INVENTOR.*
FRED M. MAYES
BY
ATTORNEYS

United States Patent Office 2,929,986
Patented Mar. 22, 1960

2,929,986

APPARATUS FOR IMPEDANCE MEASUREMENTS

Fred M. Mayes, Newtown Square, Pa., assignor to Sun Oil Company, Philadelphia, Pa., a corporation of New Jersey Application April 19, 1955, Serial No. 502,497

4 Claims. (Cl. 324—57)

This invention relates to methods and apparatus for impedance measurements and has particular reference to the measurement of small impedance changes particularly when the impedance which is measured is required to be remote from electronic measuring apparatus.

As will appear hereafter, the word "measurement" is used in a quite broad sense, not limited to the ascertainment of numerical values, but including the production of outputs which are functionally related to the impedance and utilized for observation, recording, control, or like purposes. For simplicity in describing the invention, reference will be primarily made to measurements of small capacitances or small changes in capacitances though it will become evident that the invention is equally applicable to the measurement of impedances and small changes in impedances quite generally.

Numerous occasions arise for the measurement of capacitances but, in general, it has been necessary to associate closely with the capacitances to be measured electronic apparatus which gives rise to signals which are functions of the capacitances. For example, it has been recognized that an ideal method for measuring very small capacitances or changes in capacitances involved the utilization of the capacitance undergoing measurement as a tuning element of an oscillator, whereby high sensitivity is secured by producing beats susceptible to detection and measurement. In other cases, capacitances are measured by their incorporation in bridges, or other circuits, which are activated by alternating currents. In all such cases, vacuum tubes and associated apparatus must be located closely adjacent to the capacitances undergoing measurement or precautions must be taken to insure that any more remote connecting devices do not introduce spurious capacitances which would be added to that to be measured. In particular, troubles arise where the measurement of a capacitance is used for the detection of a level of material or for the determination of some quality of a material by utilization of changes in its dielectric constant or its conductivity. Such measurements, for example, are sometimes required to be made where the condenser providing the capacitance to be measured is necessarily at a quite high temperature, so high as to preclude exposure thereto of any but highly specially designed electronic equipment. If an attempt is made to provide a remote connection, as for example by a coaxial cable, such connection will introduce a capacitance of its own which is so large that minor changes due to temperatures or mechanical displacements will cause variations in capacitance which may be much greater than the variations requiring measurement. For example, a coaxial cable may have a distributed capacitance of about 50 micromicrofarads per foot. Yet the changes in capacitance which it may be desired to measure may be of the order of less than one micromicrofarad which, for a cable of such length as may be ordinarily required, will represent only a very small fraction of the total distributed capacitance of the cable, with the result that even minor temperature changes may produce corresponding changes in the cable capacitance completely masking the changes to be detected. The general object of the present invention is the provision of methods and apparatus for making impedance measurements while practically eliminating any effects of capacitance or other impedance changes in a connecting cable or the like. Not only may remote measurements be made without the presence of any vacuum tubes or other bulky or mechanically- or temperature-sensitive apparatus adjacent to the capacitance to be measured but, as will become more apparent hereafter, it is possible to utilize a single measuring apparatus with a plurality of cables running to impedances to be measured with the possibility of switching from one to the other without the necessity for making adjustments to compensate for the connecting lines. This independence of connections is also of major advantage in the making of field measurements where lengths and dispositions of cables, or the like, are subject to quite arbitrary variation. Thus, for example, the invention is applicable to geophysical prospecting work, such as seismographic work, where it is impractical to provide at a detector a substantial amount of electronic apparatus whereas there can be provided a quite small detector housing a capacitance-type pickup, or the like, together with a very minor amount of electrical circuitry.

The invention is applicable to automatic control and measurement, as will be pointed out hereafter.

The objects of the invention relate generally to the attainment of results such as described above, and the broad objects, as well as specific objects, particularly relating to details of apparatus and operation will become apparent from the following description read in conjunction with the accompanying drawings, in which.

Figure 1:
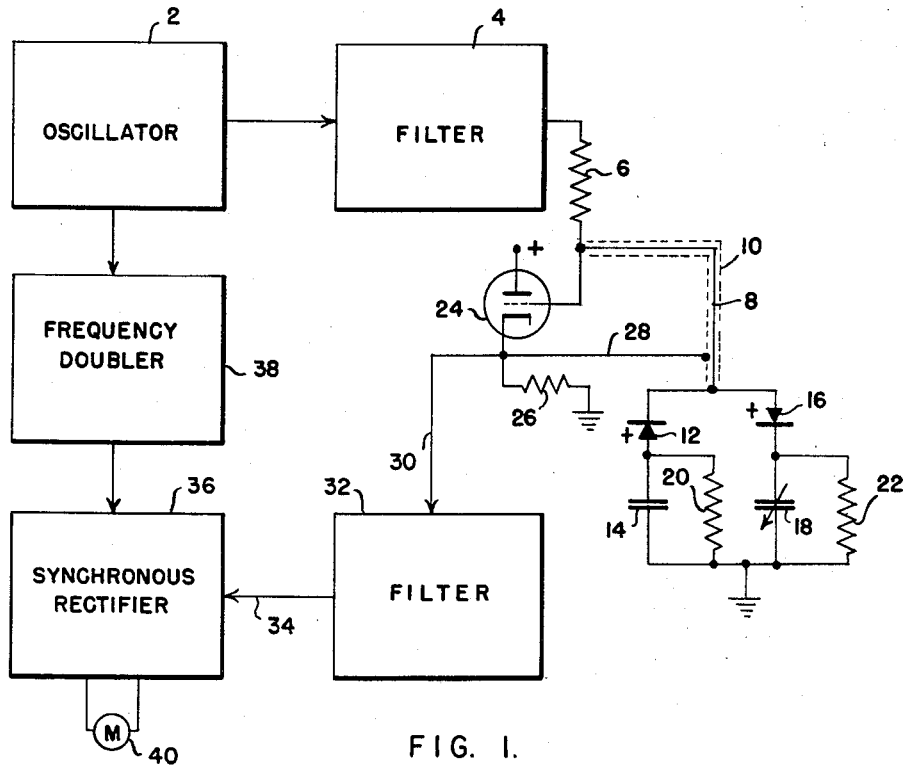
Figure 1 is a wiring diagram showing one form of apparatus provided in accordance with the invention.

Referring first to Figure 1, there is indicated at 2 an oscillator which may be of any desired type arranged to provide an alternating current output at a frequency $f$ suitable to secure proper results from the particular impedance involved in the measurement. If such impedance is a small capacitance, a higher frequency should be used than if it were a larger capacitance. The oscillator 2 may provide a sine wave or may be a generator of some other symmetrical wave such as a square or triangular wave. Assuming, however, for purposes of simplicity and consistency of description that a sinusoidal wave is generated, the output from the oscillator is fed through a filter 4 arranged to reject at least the second harmonic components of the oscillator output and, preferably, both the second and other even harmonics. The output from the filter 4 which may be assumed substantially free of second harmonic components is delivered through a load resistor 6 to the central conductor 8 of a coaxial cable the sheath of which is indicated at 10. This cable may be of great length and serves to provide communication between a pick-up assembly and a recording or indicating station. As will appear, it is such a cable which gives rise, in general, to difficulties in the measurement of remote impedances since the capacitance of the cable itself may well vary to an extent considerably greater than the variations to be measured.

At the pickup location there are located the elements illustrated in Figure 1 as connected to the lower right-hand end of the central conductor 8. Connected between this conductor and ground is the series arrangement of a diode 12 and capacitance 14, the latter being a reference capacitance which may be assumed in Figure 1 to be supplied by a condenser of accurately maintainable value. However, this reference capacitance may be of a type which will vary with the capacitance to be measured with one variable, say temperature, while not varying therewith with respect to a particular variable, say dielectric constant, which it is desired to measure.

The cable 8 is also connected through a second diode 16 and the capacitance 18 to be measured to ground. It will be noted that the diodes 12 and 16 are arranged with opposite poles connected to the conductor 8. An asymmetry is thus introduced into the circuit including the capacitances 14 and 18. These capacitances are respectively shunted by resistors 20 and 22 which should have values considerably in excess of the forward resistances of the diodes but less than their reverse resistances. The diodes 12 and 16 may be conveniently of conventional germanium type and for highest accuracy should be closely matched in their characteristics. If they differ in their forward resistance characteristics, some compensation may be provided by an additional resistance in series with the one having the lower forward resistance. Resistors 20 and 22 should be chosen very nearly equal.

The input end of cable 8 is connected to the grid of a triode 24 arranged as a cathode follower with the resistor 26 connected between its cathode and ground. The cathode of triode 24 is connected at 28 to the sheath 10 of the coaxial cable. As will be evident, by reason of this connection the sheath potential is maintained at all times very nearly that of the conductor 8 with the result of minimizing the effective capacity of the conductor 8 to ground.

The cathode of triode 24 is also connected at 30 to a filter 32 arranged to reject the fundamental frequency $f$ but pass its second harmonic. The output from the filter 32 is fed through connection 34 (which would in most cases include an amplifier, not shown) to a synchronous rectifier 36 which receives a switching signal at the second harmonic frequency from a frequency doubler 38 which is fed with the fundamental frequency by the oscillator. The synchronous rectifier may desirably be of the type described in the patent to Shawhan No. 2,559,173, dated July 3, 1951. As described in said patent, such a rectifier is capable of high discrimination of the signals of the frequency of the switching signal, and provides a direct output constituting a measure of the input signal components of the switching frequency, the direct output also indicating by its sign the phasing of the signals with respect to the switching signal. A direct current meter 40 is indicated in Figure 1 as receiving the output from the synchronous rectifier.

The circuit just described operates as follows:

If the capacitances at 14 and 18 are the same and if the diodes 12 and 16 are matched and the resistors 20 and 22 are also matched, the signal appearing at the grid of triode 24 will contain only fundamental and odd harmonic components, this signal being symmetrical. In particular, it lacks a second harmonic component.

If, however, the capacitances 14 and 18 are different, the signal appearing at the grid of triode 24 will be asymmetrical, the degre of asymmetry, and therefore its second harmonic content, being a direct measure of the difference between the capacitances. The phase of the asymmetry, furthermore, depends upon which of the capacitances is in excess of the other. The resulting signal in passing through filter 32 has its fundamental component removed and the output contains the second harmonic (with, perhaps, other harmonics which will not adversely affect the results). The second harmonic output from filter 32 is detected in the synchronous rectifier 36 which is fed with a second harmonic switching signal, with the result that at the meter 40 there is provided an output which in magnitude is a function of the difference between the capacitances at 14 and 18, and which in sign is dependent upon which capacitance is larger. The signal thus provided is linear over a considerable range for all practical purposes, and, consequently, the meter 40, if it has a central zero, may be directly calibrated in terms of capacitance 18 if the capacitance 14 is considered a fixed reference. In any event, the indications will be in terms of the difference of the capacitances whether or not the capacitance 14 varies with one or more variables with the capacitance 18. Furthermore, to the extent that the indication may be non-linear, preliminary calibration may be used to ascertain the precise meanings of the reading on meter 40.

It will be evident from the foregoing that the cable and, in fact, all connections to the left of the lower right-hand end of the conductor 8 can have no substantial effect on the indication of the capacitance difference which is to be measured. This is, of course, true only if the variations are not synchronized with the input frequency or its second harmonic. However, the usual disturbances are those due to low frequency temperature variations of the cable or low frequency mechanical changes in its position or shape. Consequently, by the choice of a suitably higher frequency $f$ (which may range from relatively low audio frequencies to high radio frequencies) the usual disturbances may be readily eliminated. What actually occurs, of course, is that the diodes 12 and 16 are successively switched or operated differentially to bring the elements connected thereto relatively more or less into the circuit by the positive and negative half cycles of the supplied input. This action occurs locally at the pickup, and for the alternative switching or controlling half cycles the remainder of the apparatus remains substantially constant. It may be here pointed out that operation may involve either "switching" in the sense that the alternate half cycles selectively cut off the diode or may involve merely asymmetrical operation of the diodes if the excitation amplitude is relatively low so as not to effect actual cut-off of the diodes.

The circuit may be used for many purposes and the output at 40 may either be in the form of an indication or a recording, a recording meter being used at 40 in the latter case. Reference may be made to the application of Shawhan, Serial No. 449,437, filed August 12, 1954, for a complete discussion of the types of uses to which the present invention is adapted, said application disclosing also an arrangement for the measurement of small capacitance changes without limitation due to the use of a long cable between the pickup and indicating or recording station. In particular, reference may be made to the possibility of switching the recording apparatus to a large number of cables running to detectors so that a single recording or indicating unit may be used for the measurement of a large number of capacitances or capacitance differences. Reference may also be made to the application of Shawhan, Serial No. 502,445, filed April 19, 1955, which illustrates how a capacitance measuring device of this type may be applied to the measurement of a large variation of capacitance or to large ranging of a variable on which the capacitance depends.

It will, of course, be evident that the capacitances 14 and 18 are merely representative of general impedances which may be measured by the use of the invention in giving rise to asymmetrical outputs susceptible of having their asymmetry detected. For example, inductances or resistances may be thus measured or compared. It may be noted that the resistances 20 and 22 are provided only to permit discharge of the capacitances at 14 and 18 between switching or asymmetrically operating cycles. Such resistances would not be required if other impedances were being measured.

What is fundamentally involved in the above is the production of a signal which has asymmetry by reason of differences in the parameters undergoing measurement. Such asymmetry involves the presence of second harmonic components and the scheme just described measures asymmetry by the measurement of second harmonic component. However, other detecting schemes for asymmetry may equally well be used, though many are inferior to that which has been described. For example, the asymmetry which is developed provides a direct component of signal at the cathode of triode 24, and a D.C. meter applied thereto measure its potential or the current through the resistor 26 will also be indicative of the asymmetry and, therefore, of the variable to be measured. Synchronized peak detection schemes, or the like, may also be used. Furthermore, the arrangement may be used to detect other even harmonics of the signal which also constitute measures of asymmetry. It is to be understood, therefore, that the invention is not to be regarded as limited by the particular second harmonic detection arrangement which has been described.

Reference may be made to the utility of the arrangement for driving the cable sheath to approximately the potential of the central conductor 8. The cathode follower arrangement described achieves this end to a substantial degree but, if desired, more elaborate means, involving, for example, the use of a differential amplifier, may be used to maintain the sheath very nearly at the potential of the cable for substantial elimination of capacitance to ground. In a null detecting arrangement such as will be later described, there is no necessity for such driving of the cable sheath. However, for precise measurement, as indicated in Figure 1, of the difference between the capacitances at 14 and 18 the sheath must either be driven as described or some compensation must be made for the capacitance between conductor 8 and ground. The reason for this is that, as such capacitance varies, the magnitude of the signal delivered to the detector assembly will vary, and the magnitude of the second harmonic content would be, to some extent, dependent upon this variation. A partial correction may be secured by measuring in addition to the output at 40 the magnitude of the fundamental frequency component appearing at the grid of triode 24, the ratio being more closely indicative of the capacitance difference which it is desired to measure. This result follows from the fact that if the capacitance of conductor 8 to ground varies, the variation in second harmonic due to this will, to a first approximation, correspond to the variation of the fundamental signal. Of course, more elaborate compensation arrangements may be provided, or the compensation may be applied as a calculated correction taking into account changes in the fundamental frequency signal.

While the invention has special utility in a system of the type just described in which remoteness of the detecting and reading stations is a factor, the invention is also applicable to situations in which, ordinarily, an impedance bridge would be used to measure impedances. The conventional bridge has the disadvantage that only one of its usual four terminals may be grounded so that either the input or the detector must have two ungrounded terminals. In accordance with the present invention, both the input and detection circuits have grounded terminals (one side of meter 40 may be grounded) and one side of each of the impedances to be compared may be grounded. Accordingly, it is easy to eliminate "body capacity" effects.

Figure 2:
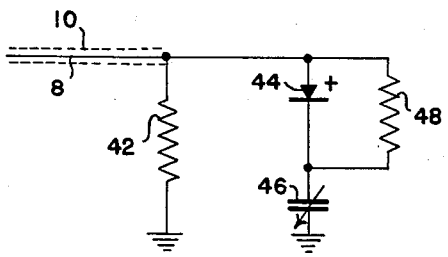
Figure 2 is a wiring diagram showing an alternative circuit arrangement which may be substituted for a portion of Figure 1.

Figure 2 shows an alternative pickup arrangement which does not involve symmetry. A resistor 42 is connected between the pickup end of conductor 8 and ground and shunted across this is the series arrangement of diode 44 and the capacitance 46 to be measured, the diode 44 being shunted by a resistor 48 having a resistance value high in comparison with the forward resistance of diode 44 but low in resistance compared with its reverse resistance. In this case there is asymmetry unless the capacitance 46 is zero. The second harmonic content, or more generally asymmetry, of the signal depends upon the value of capacitance 46 with results similar to those previously described.

The arrangement shown in Figure 2 may be used, for example, where it is merely desired to detect a substantial change in capacitance, as, for example, when a probe of capacitance type is used to detect an interface between a conducting aqueous liquid and a non-conductor such as oil.

Figure 3:
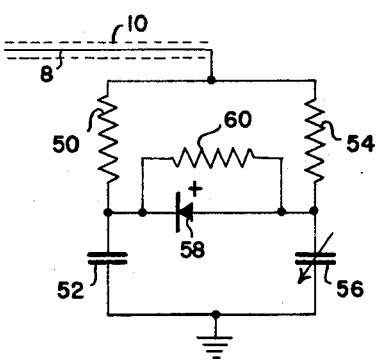
Figure 3 is a further wiring diagram showing another possible modification of the circuit of Figure 1.

A further arrangement which may be used as the detetctor is illustrated in Figure 3, in which the detector end of the conductor 8 is connected to ground through the series arrangement of resistor 50 and capacitance 52 and also by the series arrangement of resistor 54 and capacitance 56. The difference between capacitances 52 and 56 is to be measured or detected. The respective junctions between the resistors and capacitances are connected through a diode 58 shunted by a resistor 60 having a resistance value considerably greater than the forward resistance of the diode and considerably less than its reverse resistance. When the two capacitances 52 and 56 are equal, no diode current flows and, consequently, there is no asymmetry or second harmonic generation. It may be noted that in this arrangement there is no necessity for matching diodes. Sensitivity at the balance point, however, is low since for small differences in the two capacitances the forward and backward resistances of the diode do not differ greatly.

In this circuit, as well as in other circuits such as that of Figure 2, the diode may be replaced by a non-linear circuit element such as a thyrite resistor. In such case, since there is no rectifying action, the significant part of the output would be the generation of third harmonic rather than second harmonic and, consequently, the elements in Figure 1 tied up to a second harmonic therein would have to be correspondingly tied up with the third harmonic of the fundamental frequency.

Figure 4:
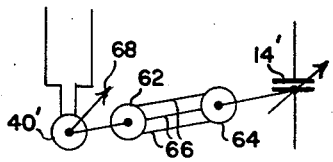
Figure 4 is a diagram illustrating a modification of Figure 1 providing a null type indication or recording.

In general, null operation should be used where high precision in measurement is required, and Figure 4 indicates how the arrangement shown in Figure 1 may be operated in null fashion, though similar provisions might be made in connection with the other modifications disclosed or in connection with others which will be obvious. In Figure 4, the output of the synchronous rectifier 36 is fed, instead of to a meter, to a motor 40' which may be of direct current type provided with permanent magnet field or with a direct current excited field so as to be reversible in accordance with the sign of the output from the synchronous rectifier. The motor 40' drives a selsyn transmitter 62 connected to a selsyn receiver 64 through the usual cable connections 66, the receiver 64 being arranged to vary a capacitance 14' located in the same position as capacitance 14 in Figure 1. It will be evident that with proper connections the operation of this arrangement will involve an adjustment of the capacitance 14' to equality with capacitance 18, and indication of the actual capacitance of 18 will be indicated by the position of the motor 40' as by a pointer 68 moving adjacent to a scale. It may also be noted that the direct current motor 40' may in this case be replaced by an alternating current motor having its winding supplied, respectively, by the frequency doubler 38 and from the filter 32, through suitable amplifiers. An alternating current motor of this type will rotate in one direction or the other determined by the phase relationships of its two inputs and, therefore, will be reversible to bring the two capacitances involved into equality.

Figure 5:
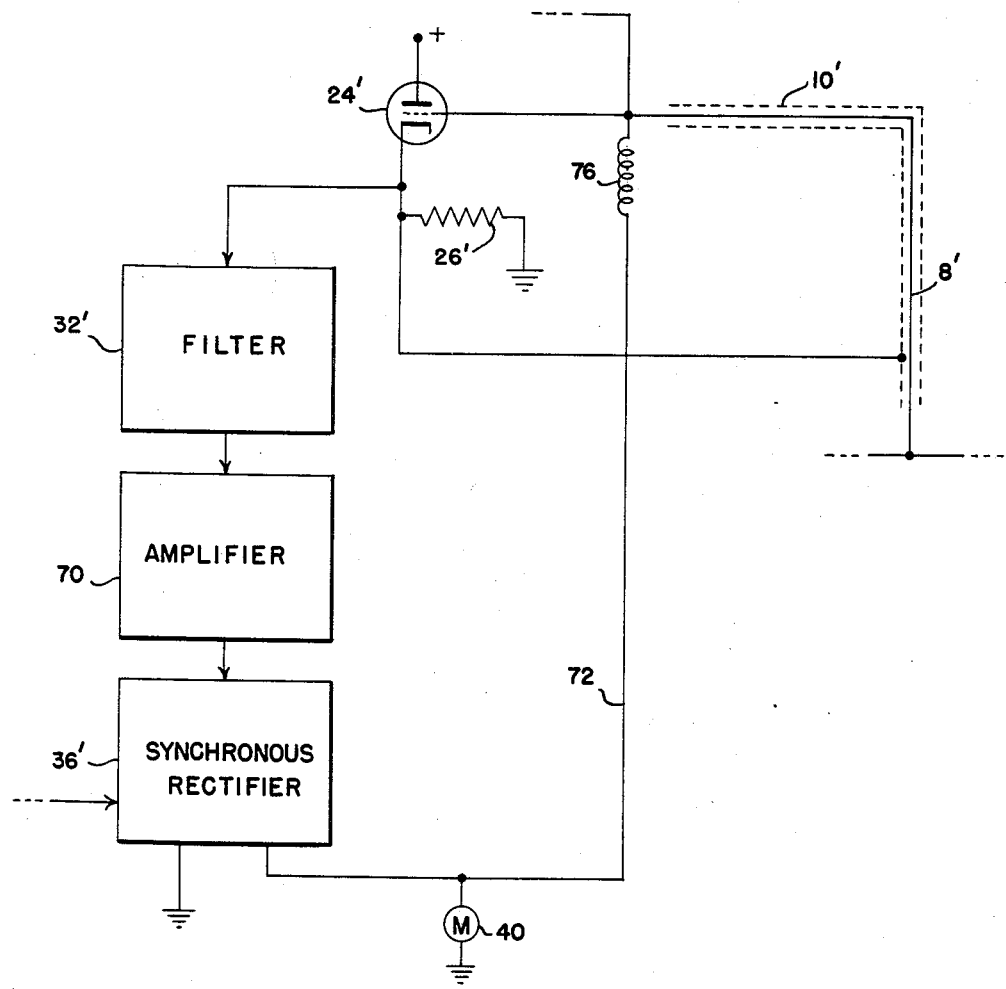
Figure 5 is a diagram showing a modification of a portion of Figure 1 to give rise to null type indication of recording.

Another type of null arrangement, but of non-mechanical type, may be provided as indicated in Figure 5 which shows a modification of Figure 1 in which elements corresponding to those of Figure 1 are indicated by the same numerals primed, Figure 5 omitting the other elements of Figure 1 the connections of which are unchanged. A detector circuit of a type such as that shown in Figure 1 in which diodes are symmetrically located but reversed in polarity may be unbalanced not only by differences in symmetrically arranged impedances but also by applying a D.C. bias to the circuit. Accordingly, a difference in the symmetrically arranged impedances may be balanced by a corresponding D.C. bias in the sense of securing a zero output of the second harmonic. Remembering that a synchronous rectifier of the type described gives a D.C. output of sign dependent upon phase, this may be utilized advantageously.

Accordingly, in Figure 5 a high gain amplifier 70 is interposed between filter 32' and synchronous rectifier 36', and connection 72 is provided to feed the synchronous rectifier output to the input end of line 8' and the grid of cathode follower triode 24', a choke 76 being provided to prevent short circuiting to ground of the alternating signals. With the connection of lead 72 to the synchronous rectifier such as to apply to the detector a bias minimizing the second harmonic signal resulting from the differences of values of the detector impedances, a very small residual second hamonic signal appearing at the input to amplifier 70 will give a large output at 72. The feedback which results has its effect directly on the detector circuit and drifts in the circuitry on the input side of the cable have their effects substantially eliminated, the ultimate reading being of the potential to ground of connection 72 by meter 40', as shown, or of the direct current through lead 72.

The fact that unbalance may be secured in a circuit such as that of Figure 1 by a D.C. bias thereof may be utilized to make temperature measurements by locating a thermocouple in the common ground connection of capacitances 14 and 18. Or if radiation is to be measured a current-generating photocell may be there inserted. Such expedients may also obviously be used in the null sytem of Figure 5.

While diodes have been primarily referred to above as the elements having asymmetric properties giving rise to second harmonics, it will be evident that other asymmetric elements may be used such as gas conduction elements, saturable reactors, or the like. Furthermore, it will be evident that the asymmetric property may be that of the impedance which varies and which is to be measured. For example, if light is the variable to be measured, the impedance involved may consist of a photocell or phototransistor and pairs of such elements may be oppositely connected, for example as in Figure 1 replacing the pairs of elements 12, 14 and 16, 18.

As will be evident from the foregoing description, numerous changes may be made in the particular elements involved as will be further made evident by consideration of said Shawhan applications referred to above.

It is to be understood, therefore, that the invention is not to be regarded as limited except as required by the following claims.

What is claimed is:
1. Apparatus for providing a response measuring variation of an impedance comprising a circuit including a pair of impedances, one of which is said variable impedance, and a pair of diodes individually coupled to said impedances and differently related thereto to provide different paths of flow for currents flowing in opposite directions, means supplying excitation of sinusoidal waveform to said circuit to produce a harmonic of said waveform due to said different current flow paths, and means receiving said harmonic and providing an output in response to said harmonic to serve as a measure of said variable impedance.

2. Apparatus according to claim 1 in which said harmonic is the second harmonic of said sinusoidal waveform.

3. Apparatus for providing a response measuring variation of an impedance comprising a circuit including said variable impedance and a second impedance and having input terminals, said impedances being similarly located with respect to said input terminals and said circuit including at least one non-linear element coupled to said impedances and disposed differently with respect to said impedances to provide different paths of flow for currents flowing in opposite directions between said input terminals, a transmission line connected at one of its ends with one of said input terminals, said transmission line having a total distributed capacitance such that uncontrollable changes of reactance may be expected therein in excess of changes in magnitude of said variable impedance, means providing through said transmission line to said circuit sinusoidal excitation current, and means electrically coupled with the other end of said transmission line and responsive through the transmission line to a harmonic of said sinusoidal excitation produced by said circuit.

4. Apparatus according to claim 3 in which a non-linear element is coupled with each of said impedances and in which said elements are differently disposed with respect to said impedances.

References Cited in the file of this patent

UNITED STATES PATENTS

| | | |
|---|---|---|
| 2,380,791 | Rosencrans | July 31, 1945 |
| 2,381,155 | Frommer | Aug. 7, 1945 |
| 2,508,478 | Uehling | May 23, 1950 |
| 2,597,088 | Dutilh | May 20, 1952 |
| 2,651,940 | Kline | Sept. 15, 1953 |

OTHER REFERENCES

Avins: Audio Engineering, "Intermodulation and Harmonic Distortion Measurements," October 1948, pp. 17 and 18.